United States Patent Office 3,492,287
Patented Jan. 27, 1970

---

3,492,287
MONOAZO HETEROCYCLIC DYESTUFFS
Hermann Wunderlich, Cologne, Mulheim, and Gerhard Wolfrum, Opladen, Germany, assignors to Farbenfabriken Bayer Aktiengesellschaft, Leverkusen, Germany, a corporation of Germany
No Drawing. Filed Sept. 8, 1966, Ser. No. 577,805
Claims priority, application Germany, Sept. 17, 1965,
F 47,226
Int. Cl. C09b 27/00; D06p
U.S. Cl. 260—154
5 Claims

ABSTRACT OF THE DISCLOSURE

Azo dyestuffs which are free from sulphonic acid and carboxylic acid groups and correspond to the formula

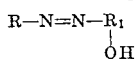

in which R represents the radical of an aromatic heterocyclic, six membered ring containing at least one nitrogen atom, and in which $R_1$ stands for a radical selected from the group consisting of members of the benzene series in which the OH and azo groups are in the o-position to each other and members of the naphthalene series in which the OH group stands in the α-position and the azo group in the adjacent β-position.

---

It has been found that valuable azo dyestuffs are obtained by reacting 1 mol of a hydrazine compound of the formula $$R-NH-NH_2 \quad (I)$$

wherein R represents the radical of an aromatic-heterocyclic, six-membered ring containing at least one nitrogen atom, with approximately 1 mol of an o-quinone of the benzene or naphthalene series, choosing the starting components free from sulphonic acid and carboxylic acid groups, and optionally treating the azo dyestuff obtained with metal-yielding agents in substance, on or in a substrate.

The hydrazines of the Formula I to be used contain, by definition, at least one nitrogen atom in the aromatic-heterocyclic ring R to which the hydrazine radical is directly linked; the compounds generally contain one, two or three nitrogen atoms. The hydrazine group is preferably linked to a carbon atom of the hetero-ring R which stands in an adjacent position to a nitrogen atom. The heterocyclic rings R may also contain fused aromatic-carbocyclic or -heterocyclic rings.

The reaction of the starting components takes place in approximately equimolecular proportions, preferably in a weakly acid to strongly acid aqueous or organic-aqueous medium at room temperature to boiling temperature. The resultant dyestuffs which are hardly soluble or insoluble in water, are isolated in the usual manner.

Hydrazine compounds (I) suitable for the present reaction are the following, for example:

2-hydrazino-pyridine,
3-chloro- or 3-methyl-2-hydrazino-pyridine.
2-hydrazino-pyrimidine,
4-hydrazino-pyrimidine,
4-methyl-2-hydrazino-pyrimidine,
4,6-dimethyl-2-hydrazino-pyrimidine,
4-phenyl-2-hydrazino-pyrimidine,
5-phenyl-2-hydrazino-pyrimidine,
5-chloro-2-hydrazino-pyrimidine,
5-bromo-2-hydrazino-pyrimidine,
4-methoxy-2-hydrazino-pyrimidine,
5-methoxy-2-hydrazino-pyrimidine,
4-methoxy-6-methyl-2-hydrazino-pyrimidine,
2-hydrazino-pyrazine,
3-hydrazino-pyridazine,
6-chloro-3-hydrazino-pyridizine,
2-hydrazino-4-methyl-6-methoxy-triazine-(1,3,5),
2-hydrazino-4,6-diphenyl-triazine-(1,3,5),
2-hydrazino-quinoline,
2-hydrazino-4-methyl-quinoline,
2-hydrazino-quinoxaline,
3-chloro-2-hydrazino-quinoxaline,
2-hydrazino-quinazoline and
4-hydrazino-quinazoline.

Of the hydrazine compounds (I) to be used, those of the pyrimidine and quinoxaline series are of special interest, in which, by definition, the hydrazino group in the quinoxaline compounds stands in the heterocyclic ring.

The hydrazines to be used according to the present process are produced by known methods, e.g. by the reaction of hydrazine hydrate with nitrogen-containing, aromatic, six-membered heterocycles substituted by chlorine, bromine, mercapto, methylmercapto, carboxymethyl-thio or sulpho groups in a suitable position.

The series of o-benzoquinones and o-naphthoquinones to be used according to the process include, for example:

tetrachloro-benzoquinone-1,2,
tetrabromo-benzoquinone-1,2,
4-methyl-benzoquinone-1,2,
4-butyl-benzoquinone-1,2,
3,5-di-tert.-butyl-benzoquinone-1,2,
3,5-dimethyl-benzoquinone-1,2,
1,2-naphthoquinone,
4-methoxy-1,2-naphthoquinone,
4-methyl-1,2-naphthoquinone,
4-morpholino-1,2-naphthoquinone and
4-anilino-1,2-naphthoquinone.

According to a variant of the process of the present invention, it is also possible to use, instead of isolated 1,2-benzoquinones and 1,2-naphthoquinones, their preliminary stages, for example, the 1- or 2-phenols, 1- or 2-naphthols, 1-amino-2-phenols and 1-amino-2-naphthols, in the presence of dehydrogenating or oxidising agents, such as atmospheric oxygen, hydrogen peroxide, persulphates, chromates, dichromates, potassium nitroso-disulphonate and salts of trivalent iron, for the condensation with the hydrazine derivatives (cf. inter alia, Berichte 87, page 1236 et seq., Berichte 88, page 802, J. Am. Chem. Soc. 61, page 420, J. Am. Chem. Soc. 74, page 278).

The dyestuffs obtainable according to the invention correspond to the formula

in which R has the same meaning as above and $R_1$ stands for a radical of the benzene series in which the hydroxyl and azo group are in the o-position to each other, or for a radical of the naphthalene series in which the hydroxyl group is in the α-position and the azo grouping in the adjacent β-position;

the dyestuffs are free from sulphonic acid and carboxylic acid groups, but may carry further non-ionic substituents.

The dyestuffs according to the invention of Formula II may also be written in the tautomeric form III

wherein the oxo-function is o-positioned to the double bonded nitrogen atom.

The range of the dyestuffs of the general Formula II includes those of outstanding interest in which R stands for a pyrimidine ring or for a quinoxaline ring linked to the azo group by the heterocycle. Quite generally, those dyestuffs are preferred in which the azo group (or the hydrazine group, in the hydrazine compounds used for the production of the dyestuffs), is linked to a carbon atom of the heterocyclic ring which stands in the adjacent position to one nitrogen atom or two nitrogen atoms.

The conversion of the dyestuffs II into their metal complex compounds can be carried out in substance, on or in a substrate e.g. on the fibre or in the fibre, for example when metal-containing synthetic fibres, especially metal-modified polypropylene fibres, are dyed.

The metal-free dyestuffs are eminently suitable for the dyeing and printing of synthetic fibres, particularly of nickel-, zinc-, copper-, aluminum- and magnesium-containing polypropylene fibres or woven or knitted fabrics produced therefrom. These polypropylene fibres contain spun into them the above-mentioned metals, for example, in the form of phenolates, fatty acid salts, heterocyclic complexes, dithiocarbamates, phosphates, inorganic salts or complex compounds.

Since the dyestuffs are insoluble or hardly soluble in water, dyeing is expediently carried out in the presence of dispersing compounds. Swelling agents may be added to the dyebath in the usual manner to accelerate the dyeing; if desired, it is also possible to dye at elevated temperatures in closed apparatus.

In addition to the technical advantages of using the metallisable or metal-containing dyestuffs obtainable according to the invention, the new process offers special advantages; it permits the production of a great number of dyestuffs of the Formula II, which can not be obtained by the conventional methods of diazotising and coupling, since either the diazo compounds of the corresponding heterocycles R are not stable, and/or coupling with 1-naphthol derivatives which are unsubstituted in the 4-position takes place usually and preponderantly or even exclusively in the 4-position and not in the 2-position.

If the dyestuffs of the Formula II are to be metallised in substance, then copper-, nickel- or cobalt yielding agents, such as the corresponding sulphates, chlorides and the like, may be considered for this purpose in the first place.

In the following examples, which are given for the purpose of illustrating the present invention, parts are parts by weight and temperatures are given in degree centigrade.

EXAMPLE 1

15.8 parts finely powdered 1,2-naphthoquinone are suspended in 250 parts 5% sulphuric acid and slowly mixed, while stirring vigorously, with a suspension of 16.5 parts 2-hydrazino-quinoxaline in 250 parts 5% sulphuric acid. The formation of the dyestuff sets in immediately. After stirring for one hour at 40–50°, the mixture is buffered with a dilute sodium hydroxide solution and with a sodium acetate solution, the product is filtered off and washed. The precipitated dyestuff has the formula

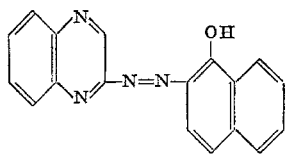

0.2 part of this dyestuff and 0.2 part of a naphthalene sulphonic acid formaldehyde condensation product are dispersed in 400 ml. water and adjusted to pH 5–6 with dilute acetic acid. 10 grams of metal-modified polypropylene fibre yarn are introduced and dyed for one hour at boiling temperature. After a subsequent weakly alkaline after-treatment at 50° with the addition of 0.5 g. per litre of a commercial detergent, a blue-green dyeing with very good fastness to wet processing, rubbing, solvents and light is obtained.

As metal-modified polypropylene fibres, there were used in this example those polypropylene fibres which contain, besides ultra-violet absorbents and stabilisers, spun into them nickel chelate complexes, such as nickel phenolates of bis-(alkylphenol)-monosulphides.

Very valuable dyeings on nickel-modified polypropylene materials also result when, instead of 2-hydrazino-quinoxaline, the hydrazines of the following table are used:

| Hydrazine derivative: | Shade of the dyestuff on nickel-containing polypropylene materials |
|---|---|
| 2-hydrazino-pyrimidine | Reddish blue. |
| 2-hydrazino-4-methyl-pyrimidine | Red-violet. |
| 3-hydrazino-6-chloro-pyridazine | Greenish blue. |
| 2-hydrazino-4,6-diphenyl-triazine-1,3,5 | Bluish violet. |
| 2-hydrazino-4-methoxy-6-methyl-triazine-1,3,5 | Red-violet. |
| 2-hydrazino-6-chloroquinoxaline | Blue-green. |
| 4-hydrazino-quinazoline | Reddish blue-grey. |
| 2-hydrazino-pyridine | Reddish violet. |
| 2-hydrazino-quinoline | Blue. |

EXAMPLE 2

The dyestuffs produced according to the instructions of Example 1 from the hydrazines and o-quinones set out in the following table dye nickel-containing polypropylene fibres in the specified shades:

| Hydrazine | o-Quinone | Shade on nickel-containing polypropylene fibers |
|---|---|---|
| 2-hydrazino-quinoxaline | 4-methoxy-1,2-naphthoquinone | Blue-green. |
| 2-hydrazino-pyrimidine | do | Bluish violet. |

EXAMPLE 3

3.3 grams 2-hydrazino-pyrimidine are stirred with 10 ml. dilute hydrochloric acid to give a paste, which is mixed with 200 ml. water and added to a suspension of 6 g. freshly prepared 1-amino-2-hydroxynaphthalene hydrochloride in 10 ml. dilute hydrochloric acid and 200 ml. water. An aqueous solution of 10 g. potassium persulphate is added at room temperature, while stirring, and the mixture is slowly heated to 60°. The intermediarily formed 1,2-naphthoquinone is at once condensed with the hydrazine derivative.

Stirring is continued for one hour, the pH adjusted to 5–6 and the product filtered off with suction and washed with water.

The precipitated dyestuff has the constitution

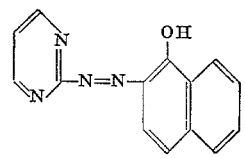

and yields on nickel-containing polypropylene materials an intensely reddish blue dyeing with good general fastness properties.

In a similar manner, there is obtained with the use of 3,4-dimethylphenol and potassium nitrososulphonate for the condensation with 2-hydrazino-pyrimidine, a valuable dyestuff which dyes nickel-containing polypropylene fibres is a bluish grey shade.

What is claimed is:

1. An azo dyestuff which is free of sulphonic acid and carboxylic acid groups and has the general formula:

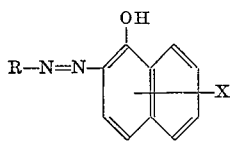

in which R is a radical selected from the group consisting of 2-pyrimidinyl, 2 - pyrazinyl, 2 - triazin - 1,3,5 - yl, 2-quinolinyl, 2 - quinoxalinyl, and 2 - quinazolinyl, said radical being unsubstituted or containing 1–2 substituents from the group consisting of lower alkyl, lower alkoxy, chloro, bromo, and phenyl, and X is a substituent from the group consisting of hydrogen, alkyl of 1–4 carbon atoms, methoxy, morpholino, and anilino.

2. The dyestuff of the formula

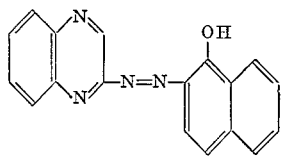

3. The dyestuff of the formula

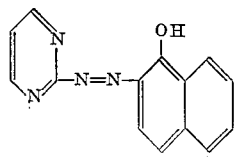

4. The dyestuff of the formula

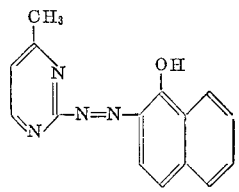

5. The dyestuff of the formula

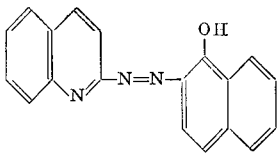

References Cited

UNITED STATES PATENTS

| | | | |
|---|---|---|---|
| 3,116,278 | 12/1963 | Gross et al. | 260—146 |
| 3,152,112 | 10/1964 | Laird et al. | 260—154 |
| 3,337,290 | 8/1967 | Pons et al. | 260—156 X |
| 3,377,337 | 4/1968 | Sugiyama et al. | 260—155 |

FOREIGN PATENTS 1,270,940   9/1962   France.

CHARLES B. PARKER, Primary Examiner

DONALD M. PAPUGA, Assistant Examiner

U.S. Cl. X.R.

8—41, 55; 260—146, 153, 155, 156